United States Patent [19]

Mizushima

[11] Patent Number: 5,519,827
[45] Date of Patent: May 21, 1996

[54] METHOD AND APPARATUS FOR CHANGING SCREEN IMAGE DATA BASED ON CURSOR MOVEMENT RELATIVE TO A PRESET MARK ON THE SCREEN

[75] Inventor: Hiroshi Mizushima, Yokohama, Japan

[73] Assignee: Hitachi, Ltd., Tokyo, Japan

[21] Appl. No.: 501,537

[22] Filed: Mar. 30, 1990

[30] Foreign Application Priority Data

Apr. 4, 1989 [JP] Japan .................................. 1-83922

[51] Int. Cl.$^6$ ........................................ G06F 3/00
[52] U.S. Cl. ................................................ 395/161
[58] Field of Search ........................... 395/144–161, 395/117–120

[56] References Cited

U.S. PATENT DOCUMENTS

| | | | |
|---|---|---|---|
| 4,723,210 | 2/1988 | Barker et al. | 395/147 |
| 4,734,689 | 3/1988 | Kurakake | 340/726 |
| 4,755,809 | 7/1988 | Ikegami et al. | 340/726 X |
| 4,815,029 | 3/1989 | Barker et al. | 395/146 |
| 4,829,470 | 5/1989 | Wang | 395/144 X |
| 4,831,556 | 5/1989 | Oono | 395/157 |
| 4,949,287 | 8/1990 | Yamaguchi et al. | 395/147 |
| 5,003,499 | 3/1991 | Fujiwara et al. | 395/146 |
| 5,021,989 | 6/1991 | Fujisawa et al. | 392/275 |
| 5,046,001 | 9/1991 | Barker et al. | 340/721 X |
| 5,072,412 | 12/1991 | Henderson, Jr. et al. | 395/159 |
| 5,146,555 | 9/1992 | Kiyohara | 395/157 |

FOREIGN PATENT DOCUMENTS

| | | |
|---|---|---|
| 62-140124 | 6/1987 | Japan . |
| 62-212717 | 9/1987 | Japan . |
| 62-214423 | 9/1987 | Japan . |
| 62-229317 | 10/1987 | Japan . |

OTHER PUBLICATIONS

Diane Burns and S. Venit, "Change of XPression", Jan. 1989, pp. 136–145.
Robert Virkus, "Page–Layout Play–Offs", Jan. 1990, pp. 104–133.
"HyperCard. What is it?", Richard Dear, Byte, 1988, pp. 71–77.
Microsoft Windows Paint User's Guide, V. 10, Microsoft Corp., 1985, pp. 14–15.
King's Quest Operating Manual, IBM Personal Computer Software, May 1984, pp. 1 and 11–14.
Police Quest 2 Manual, Sierra On–Line Inc., 1989, pp. 1–22.

Primary Examiner—Raymond J. Bayerl
Assistant Examiner—John E. Breene
Attorney, Agent, or Firm—Antonelli, Terry, Stout & Kraus

[57] ABSTRACT

A method displaying a plurality of screen image data sequentially one after another on a screen and a data processing apparatus. A mark or area is set on a screen. The mark or area is used to instruct to change a screen image data to be displayed. An operator moves a cursor on the screen to designate the mark or are so that a screen image data to be next displayed is selected from a plurality of screen image data. The selected screen image data is displayed on the screen.

23 Claims, 10 Drawing Sheets

F I G. 10
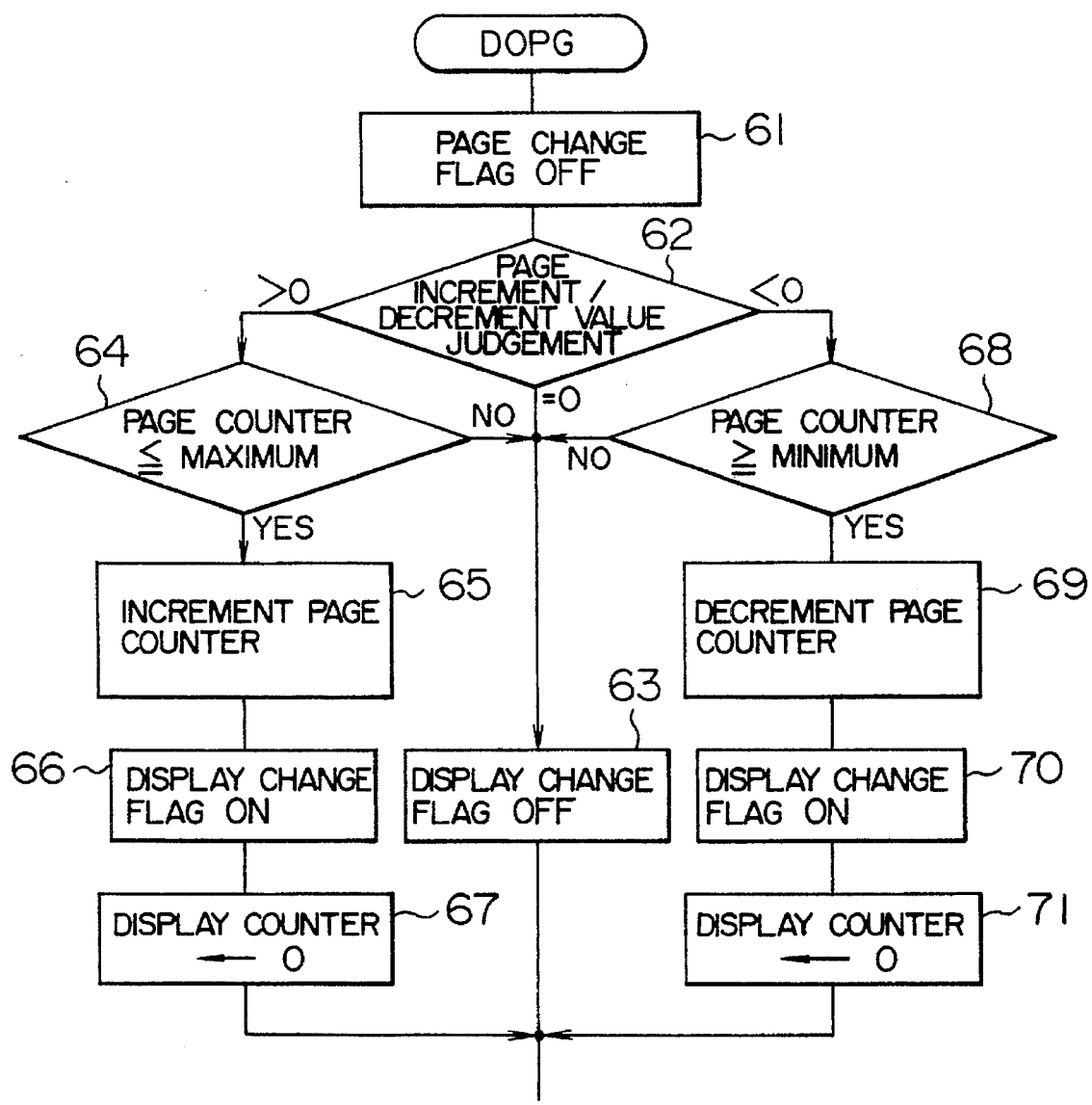

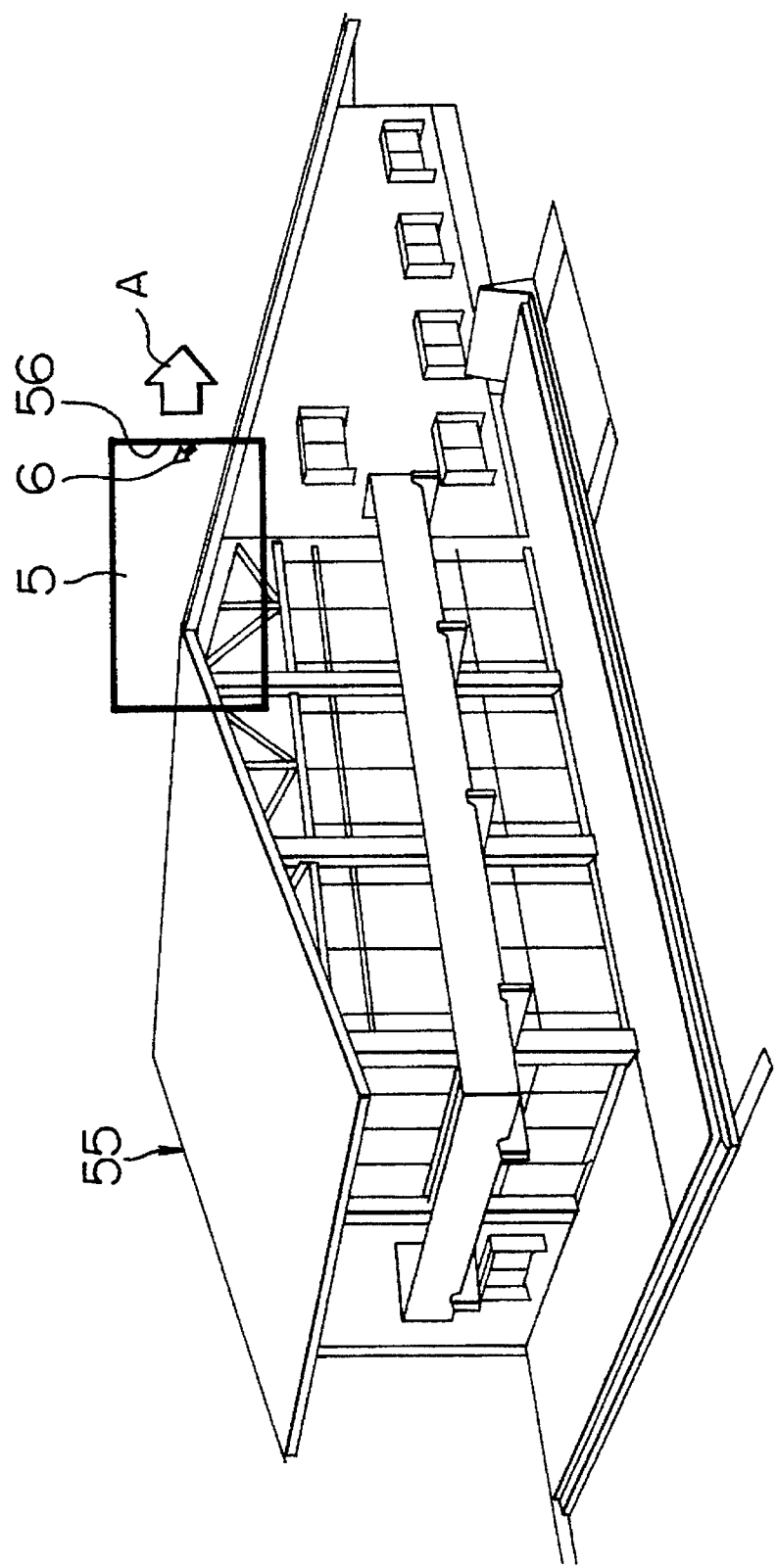

METHOD AND APPARATUS FOR CHANGING SCREEN IMAGE DATA BASED ON CURSOR MOVEMENT RELATIVE TO A PRESET MARK ON THE SCREEN

BACKGROUND OF THE INVENTION

The present invention relates to a data processing apparatus for processing text data, graphics data and the like, and more particularly to a method of changing a screen image on a display unit and data processing apparatus using such a method, suitable for efficient use in sequentially displaying a number of screen image data one after another in the manner matching a human behavior.

In a conventional data processing apparatus, in order to turn a page on a display screen, a predetermined key of a keyboard is depressed or a mouse is clicked when the mouse cursor is moved to a predetermined area on the screen.

Data processing apparatus of this type are disclosed in, e.g., Japanese Patent Laid-open Publications JP-A-62-140124 62-214423, 62-229317, 62-212717.

Personal computers, word processors and the like prevail in the general public. It is therefore desired to allow more efficient use of computers whose operation matches human behavior. One of operations used with computers is an operation to instruct a display change of a screen image. Sequentially displaying a number of screen image data on a screen one after another corresponds to manually turning pages of a voluminous book. A conventional screen image changing operation (screen image selection operation) using a keyboard or mouse buttons is far from the manual page turning operation. Further, there is a case where only a part of a large graphics image is displayed on the screen of a CAD apparatus or the like. If a keyboard or a mouse button is used in changing the image on the screen, it is difficult for an operator to recognize the continuity of the screen image when it is changed from one part to another. Also in this case, the operation does not match human behavior.

SUMMARY OF THE INVENTION

It is therefore an object of the present invention to provide a screen image changing method and apparatus therefor and a data processing apparatus equipped with such an apparatus, which is suitable for efficient use matching human behavior.

The above object can be achieved by changing a screen image when a mouse cursor crosses over a line drawn on the screen (the line may be actually drawn or it may be drawn in the sense of software without actually drawing it), or crosses over between the screen areas divided into specified areas and other areas (this division may also be actually presented or not).

In the case of a screen page of a consecutive image extending in a plane which cannot be displayed at the same time on the screen, the above object can also be achieved by changing the screen image, when a mouse cursor becomes in contact with the side edge of the screen image, to the next screen page consecutive in the direction of moving the mouse cursor.

The motion of a mouse cursor which crosses over a line or crosses over between areas is analogous to manual page turning. If a number of consecutive screen images are to be changed, the mouse is reciprocally moved in the right and left directions to cause the screen images to be changed, e.g., every one reciprocal motion thereof, thereby imitating manual page turning.

BRIEF DESCRIPTION OF THE DRAWINGS

FIG. 10 is a flow chart illustrating the page information processing shown in FIG. 5.

FIG. 13 shows an example of a screen image according to another embodiment of this invention.

DESCRIPTION OF THE PREFERRED EMBODIMENTS

Figure 1A:
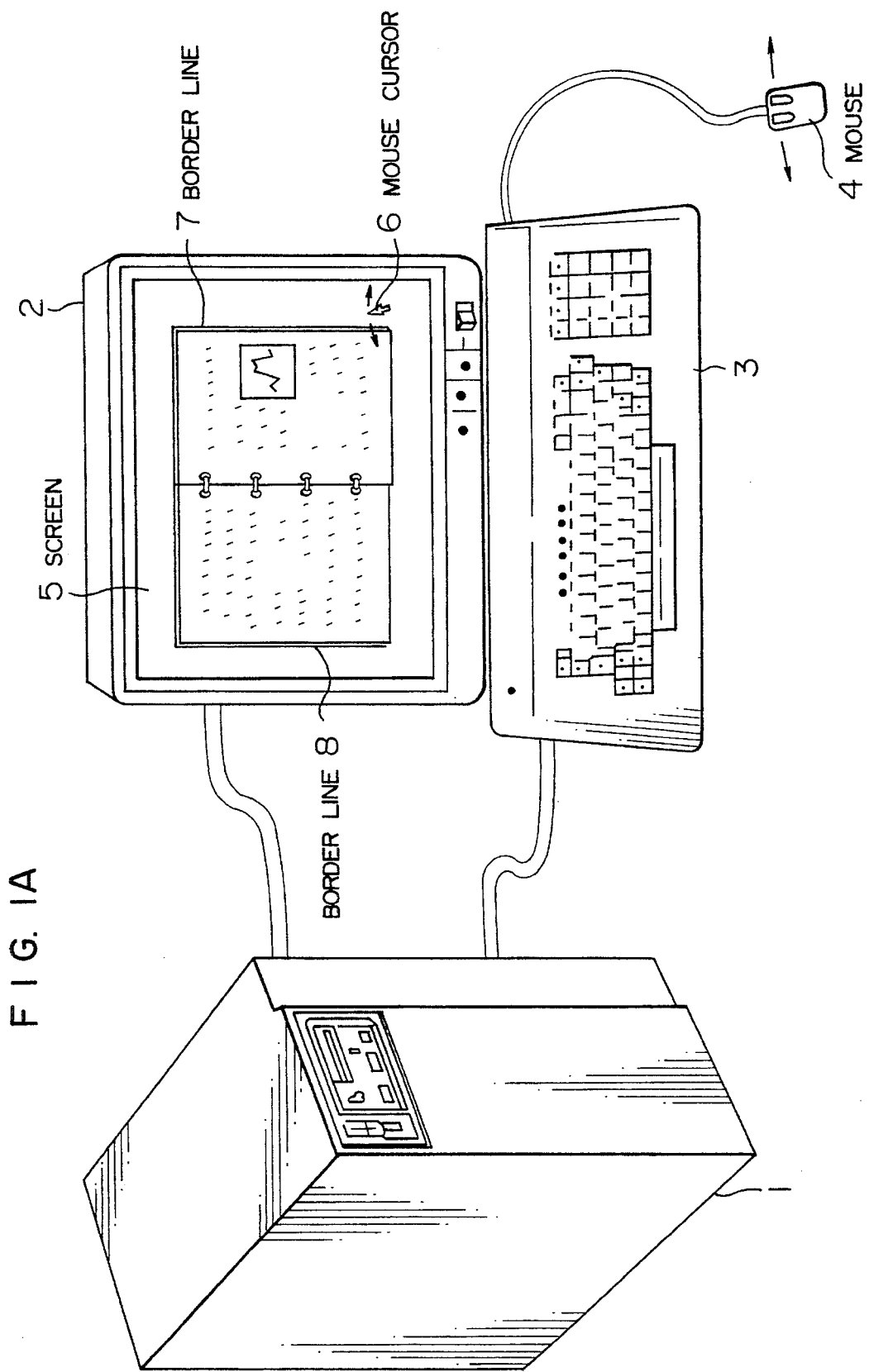
FIG. 1A is a schematic diagram showing the data processing apparatus according to an embodiment of this invention.
Figure 1B:
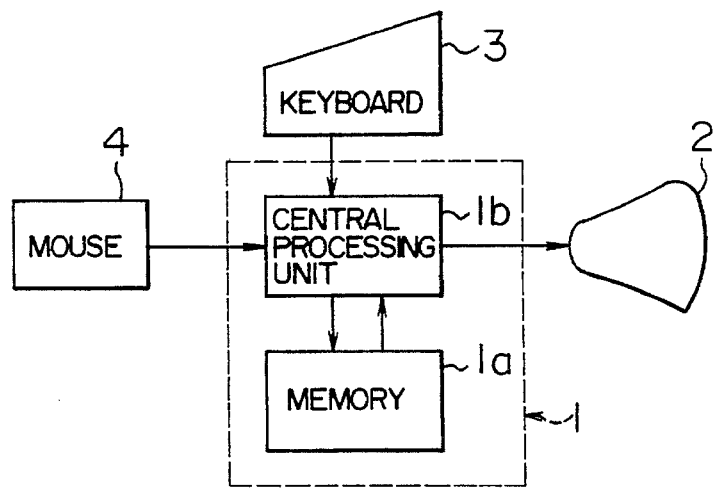
FIG. 1B is a block diagram of the data processing apparatus shown in FIG. 1A.

FIG. 1A shows the data processing apparatus according to an embodiment of this invention. The data processing apparatus shown in FIG. 1A includes a computer 1, display unit 2, keyboard 3, and mouse 4 the last two of which are used as input/output devices. FIG. 1B is a block diagram illustrating an example of the structure and function of the data processing apparatus shown in FIG. 1A.

A memory 1a of the computer 1 stores therein various data and programs. Upon an instruction from the keyboard 3 or mouse 4, a central processing unit 1b of the computer 1 reads data from the memory 1a and displays the data on the screen 5 of the display unit 2. The description is now directed to the case where a large amount of data are sequentially read. In this embodiment, when a mouse cursor 6 under reciprocal motion crosses over a border line 7 of the data display area from the right to the left, a screen image is changed. With this arrangement, an operator can change the image data display in the manner as if the manual page turning is carried out. In order to return back to the original screen image, the mouse cursor 6 is moved to another border line 8 side opposite to the border line 7. In this case, when the mouse cursor crosses over the border line 8 from the left to the right, the screen image is changed so as to match the human behavior of manually turning a page. The above operations by the mouse cursor 6 may be conducted while depressing a specific key of the keyboard 3 or clicking the button or buttons of the mouse 4. In the following description, it is assumed that a screen image is changed when the mouse cursor 6 crosses over the border line 7 or 8 while the mouse button or buttons are depressed.

Figure 1C:
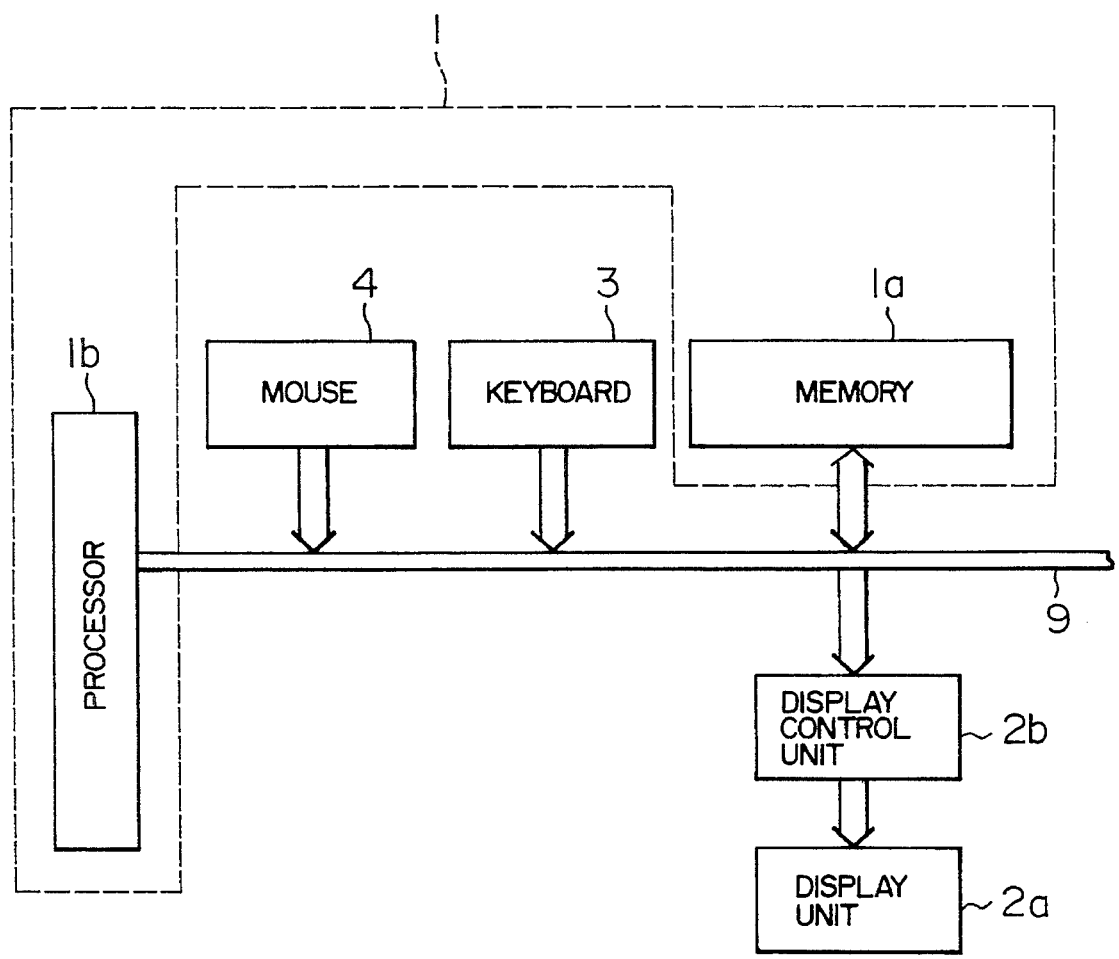
FIG. 1C is a block diagram of the data processing apparatus shown in FIGS. 1A and 1B.

FIG. 1C is a block diagram illustrating the function of the data processing apparatus of this invention, relative to a data bus 9.

Figure 2:
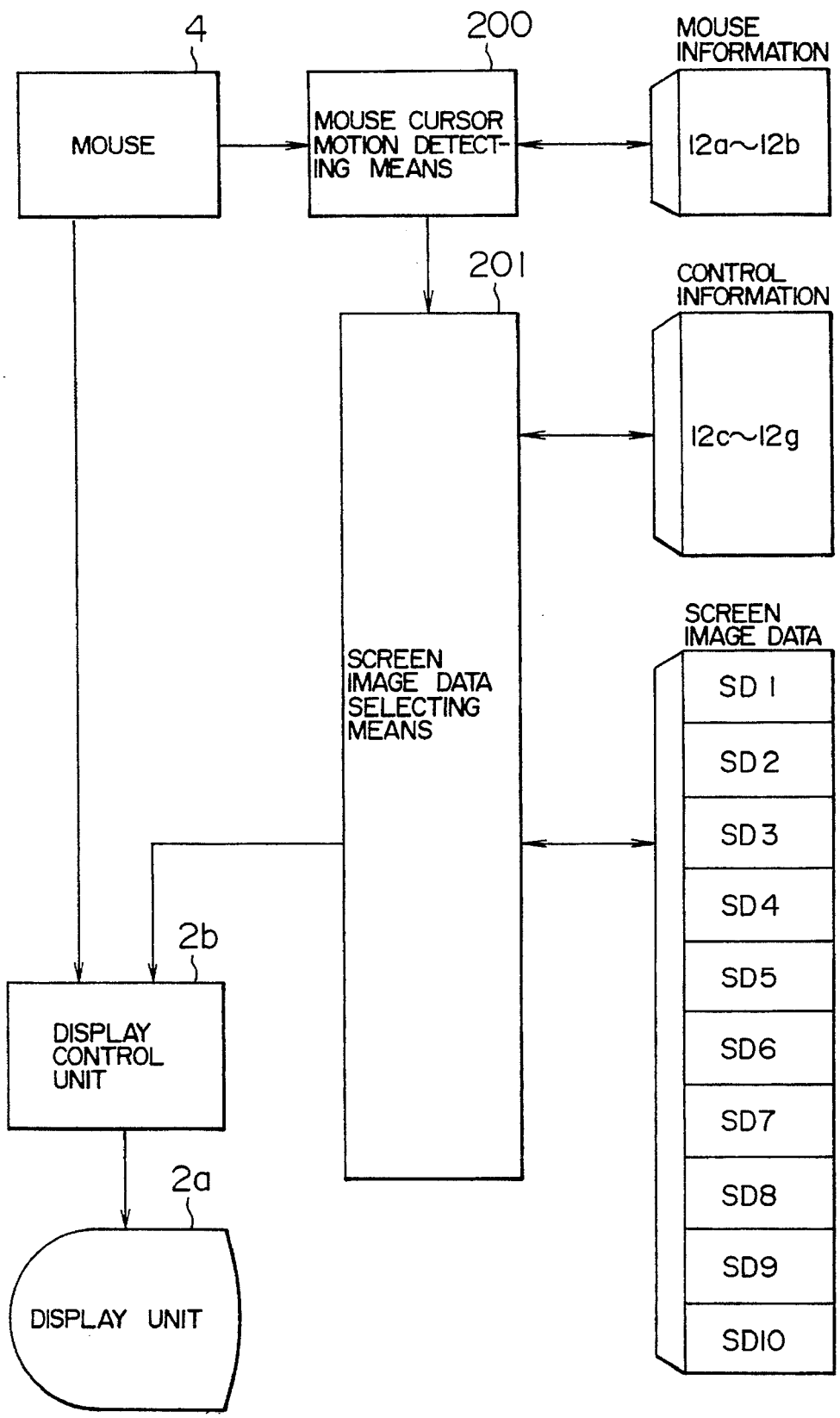
FIG. 2 is a block diagram used for explaining the principle of this invention.

FIG. 2 is a block diagram showing the principle of the present invention. The principle of the present invention will be described in brief with reference to FIG. 2. A plurality of screen image data SD1 to SD10 to be displayed on a display unit 2a are stored in the memory 1a shown in FIG. 1B or 1C. The number of screen image data is set at 10. It is possible to store an optional number of screen image data as desired. It is now assumed that the screen image data SD1, e.g., among the plurality of screen image data SD1 to SD10 is being displayed, and that an operator wishes to display another screen image data (e.g., SD2) different from the screen image data SD1 on the display unit 2a. The operator causes input means 4 such as a mouse to move the mouse cursor to a specified line or area on the screen of the display unit 2a. Mouse cursor motion detecting means 200 shown in FIG. 2 then detects the mouse motion and determines, while referring to mouse information 12a to 12b stored in the memory 1a, whether or not a screen image data changing processing (page turning processing) is to be carried out. In accordance with the decision of mouse cursor motion detecting means 200, screen image data selecting means 201 refers to control information 12c to 12g stored in the memory 1a, and executes an operation to select the screen image data SD2 for example (executes an operation to change the screen image data SD1 to the screen image data SD2). The new screen image data SD2 is displayed via a display control device 2b on the screen of the display unit 2a. In the above description, the screen image data SD2 to next the screen image data SD1 is selected by way of example. Any screen image data after the next screen image data may be directly selected instead.

Figure 3:
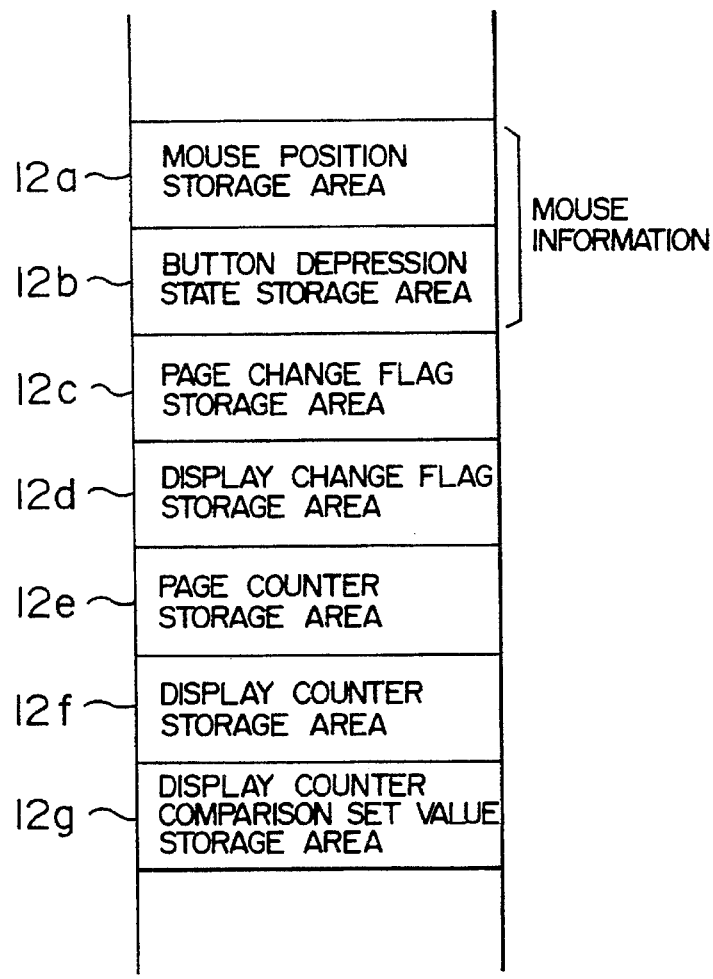
FIG. 3 is a memory map of control signal storage areas in a memory.

FIG. 3 shows the memory map of control signal storage areas of the memory 1a, the control signals being used for the page turning processing to be described later in detail. The control signal storage areas include a mouse position storage area 12a, mouse button depression state storage area 12b, page change flag storage area 12c, display change flag area 12d, page counter storage area 12e, display counter storage area 12f, and display counter comparison set value storage area 12g.

The mouse position storage area 12a stores therein the information indicating in which area within the screen 5 the mouse cursor 6 is present. For example, in FIG. 1, representing the right page of the data display area as I, the left page as II, and the other area as III, the mouse position storage area 12a stores therein the information indicating in which area among the areas I, II, and III the mouse cursor 6 is present.

The mouse button depression state storage area 12b stores therein the information indicating whether or not the right and/or left mouse button 4 has been depressed.

The page change flag storage area 12c stores therein the flag value for determining whether or not the page counter to be described later is changed.

The display change flag storage area 12d stores therein the flag value for determining whether or not the display processing routine is called.

The page counter storage area 12e stores therein the page number to be displayed.

The display counter storage area 12f stores therein the count value of interruptions after the display change flag is set.

The display counter comparison set number storage area 12g stores therein the value which is compared with the contents of the display counter to determine whether or not the processing routine is branched.

Figure 4:
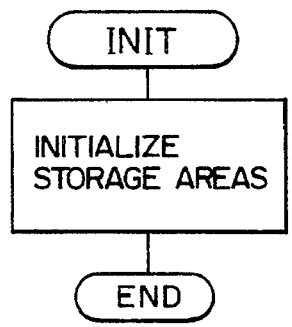
FIG. 4 is a flow chart illustrating the initialization processing shown in FIG. 5.
Figure 5:
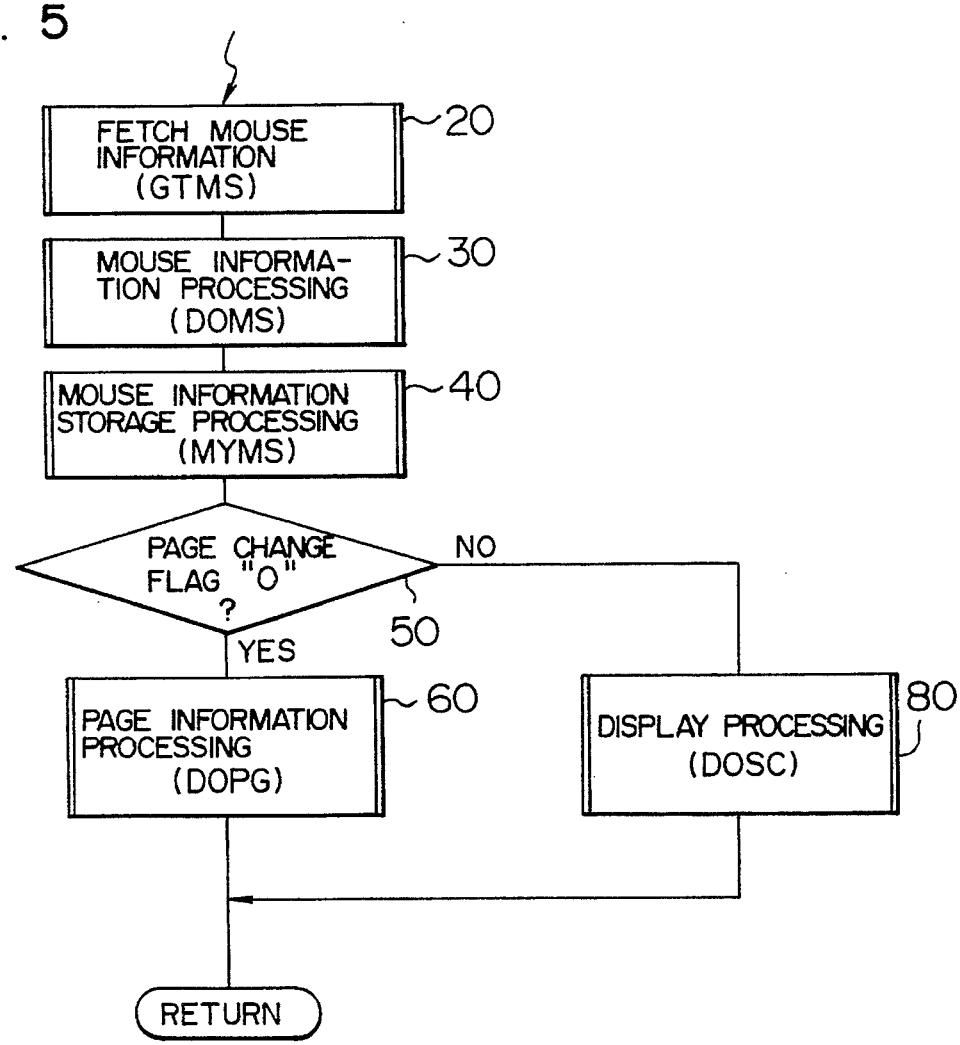
FIG. 5 is a flow chart illustrating an example of the page turning processing.

FIG. 4 is a flow chart illustrating the initialization processing executed prior to the page turning processing to be described with FIG. 5. In this initialization processing, the contents of the storage areas 12a to 12g shown in FIG. 3 are initialized and timer interruption vectors are set. This initialization is performed to allow for the obtaining information from the mouse. With this initialization, the environment for fetching the information from the mouse at a constant interval can be established. Under this environment, the page turning processing is executed.

FIG. 5 is a flow chart illustrating an example of the page turning processing, and FIGS. 6 to 12 are flow charts illustrating the details of the procedure at the steps shown in FIG. 5.

Prior to the first mouse information fetching processing (GTMS) step 20 in the page turning processing shown in FIG. 5, the timer interruption vectors have been set at the initialization processing shown in FIG. 4. At the mouse information fetching processing 20, the information is fetched from the mouse 4 and stored. At the next mouse information processing (DOMS) step 30, in accordance with the information fetched at step 20, the position of the mouse 6 on the screen is calculated, and with reference to the mouse position and mouse button depression state stored in the storage areas 12a and 12b shown in FIG. 3, it is determined if the page change flag is set or not.

At the next mouse information storage processing (MYMS) step 40, the mouse information fetched at the process 20 is stored in the storage area shown in FIG. 3. At step 50, with reference to the page change flag, it is judged if the flow advances to the page information processing (DOPG) step 60 or to the display processing (DOSC) step 80.

At the processing 60, the information fetched at the processing 20 is checked to determine the increment/decrement value of the page counter and to set or reset the display change flag. If the flag is set, the display counter is set at "0" and other processings are executed, and thereafter the interruption is terminated.

At the processing 80, in accordance with the set/reset state of the display change flag and the count of the display counter, it is determined if the display processing routine is called or not. If this routine is called, the display change flag is reset. After completion of these processings, the interruption is terminated. The processing 80 causes the screen image to be changed.

The detail of the page turning processing will be described more detail.

Figure 6:
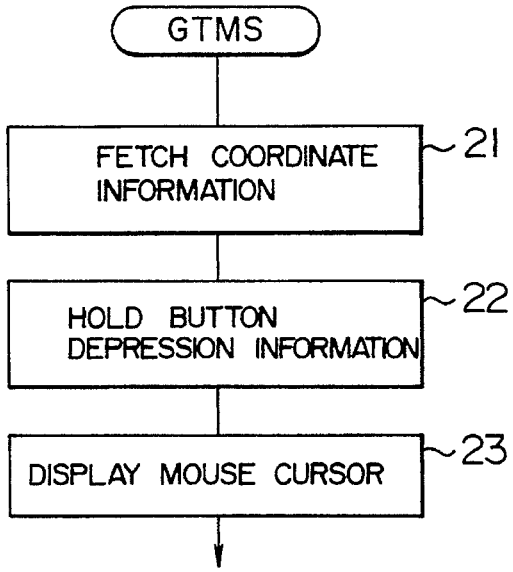
FIG. 6 is a flow chart illustrating the mouse information fetching processing shown in FIG. 5.

As shown in FIG. 6, at the mouse information fetching processing 20, the position of the mouse cursor 6 of the mouse 4 is obtained first at step 21. Then, at step 21, the depression information on the mouse buttons is obtained at step 22. After holding these two information, the mouse cursor 6 is displayed on the screen at step 23.

Figure 7:
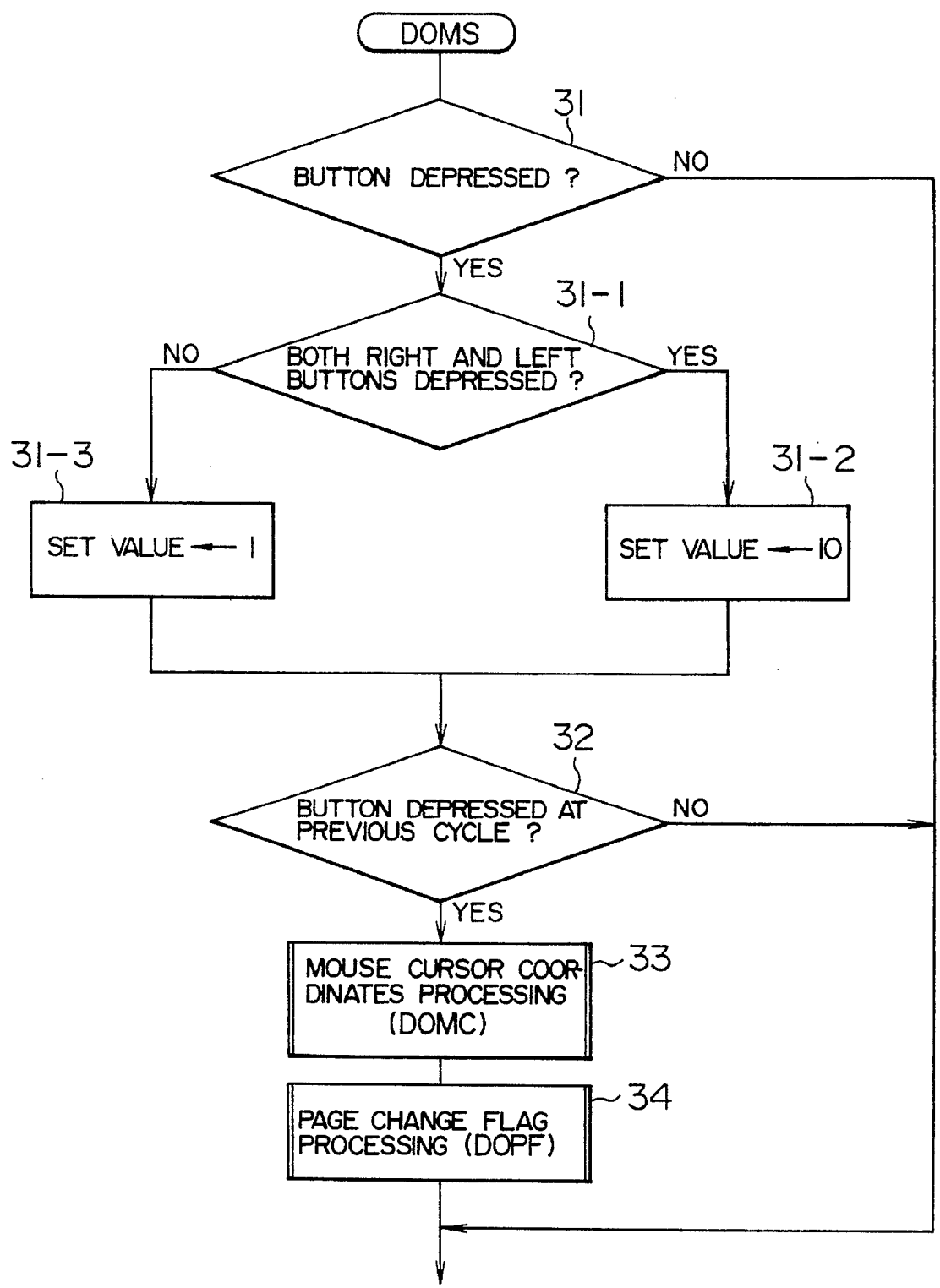
FIG. 7 is a flow chart illustrating the mouse information processing shown in FIG. 5.
Figure 8:
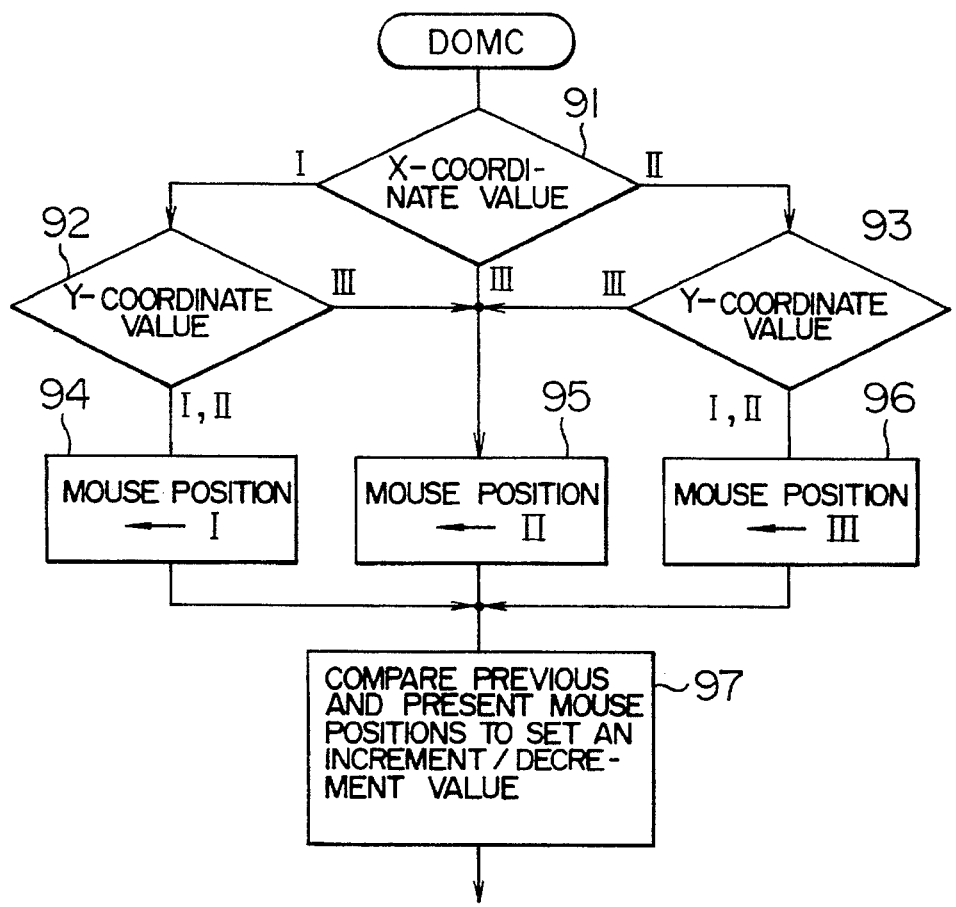
FIG. 8 is a flow chart illustrating the mouse cursor coordinates processing shown in FIG. 7.
Figure 9:
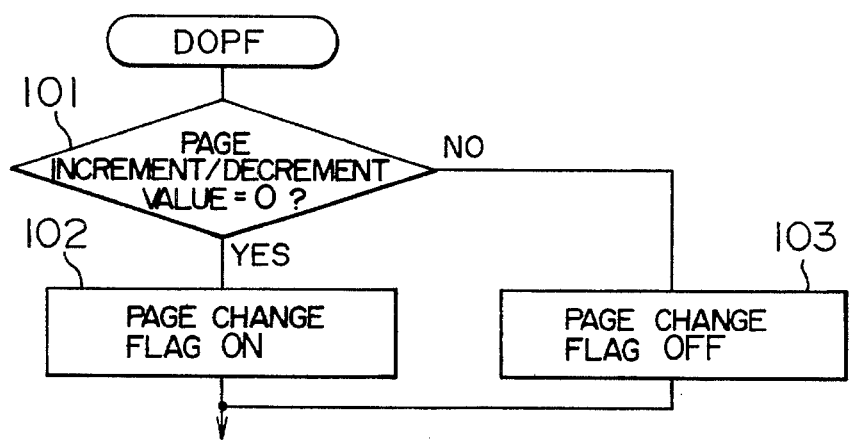
FIG. 9 is a flow chart illustrating the page turning flag processing shown in FIG. 7.

As shown in FIG. 7, at the mouse information processing 30, it is first determined at step 31 whether or not the information obtained at step 22 is the information indicating the depression state of the mouse buttons. If the mouse button has not been depressed, the flow skips the following steps 32 to 34 and jumps to the processing 40. If the mouse button or buttons have been depressed, the flow advances to step 31-1 whereat the depression state of right and left mouse buttons is checked. If both the right and left buttons have been depressed, the flow advances to step 31-2 whereat the display counter comparison set value is set at "10". If one of the right and left mouse buttons has been depressed, the flow advances to step 31-3 whereat the set value is set at "1". At step 32 it is determined whether or not the information obtained at step 22 upon execution of the page turning processing program one cycle before the present, indicates the depression state of the mouse buttons. If the information does not indicate the depression state, the flow advances to the processing 40.

The judgement of the previous and present depression states of the mouse buttons at steps 31 and 32 is conducted from the following reason. For changing the screen image in accordance with the motion of the mouse cursor 6 as described previously, the mouse 4 is moved in this embodiment while depressing the mouse buttons or buttons. If the page turning processing program is arranged to run every 10 ms for example, a page turning instruction is assumed to have been carried out as in FIG. 12 if it is judged at the program execution at point A before the border line that the mouse button or buttons were depressed, and at the program execution at point B after the border line after 10 ms later that the mouse button or buttons have been depressed.

If the judgement at step 32 is affirmative (yes), it is judged that the page turning instruction has been entered to advance to the mouse cursor coordinates processing (DOMC) step 33. At this processing 33 it is judged, in accordance with the coordinate position information obtained at step 20, at which area among the areas I, II and III the mouse cursor is present. In accordance with the judgement result, the page increment/decrement value is determined. The detail of this processing will be described with reference to FIG. 8.

The area among the areas I, II and III at which the mouse cursor is present is determined by step 91 which determines the x-coordinate value of the mouse cursor, by steps 92 and 93 which determine the y-coordinate value of the mouse cursor, and by steps 94 to 96. At step 97 the area at which the mouse cursor was present previously and the area at which the mouse cursor is now present are compared with each other, if it is determined that the area has changed, i.e., if the mouse cursor has crossed over the border line, the page increment/decrement value is set.

After the mouse cursor coordinates processing 33, the page change flag processing (DOPF) step 34 (refer to FIG. 7) is carried out. The detail of this processing will be described with reference to FIG. 9. First, at step 101 it is judged if the page counter increment/decrement value set at step 97 is " 0", the flow advances to step 102 whereat the page change flag is set at "1" and the flow enters the processing 40 shown in FIG. 5. If the increment/decrement value is "0", the flow advances from step 101 to step 103 whereat the page change flag is set at "0" and the flow enters the processing 40.

After storing the mouse information in the corresponding area shown in FIG. 4 at the processing 40, the page flag value is checked at step 50 (FIG. 5). If the page change flag takes a value "1", it is necessary to turn a page, i.e., to change the screen image so that the flow enters the page information processing (DOPG) step 60. The detail of this processing will be described with reference to FIG. 10.

The page change flag value is set at "0" at step 61. At step 62 it is judged if the page increment/decrement value is "zero", "positive number", or "negative number". If the increment/decrement value is "zero", the flow advances to step 63 whereat the display change flag value is set at "0".

The interruption is then terminated. If the increment/decrement value takes a "positive number", the flow advances from step 62 to step 64 whereat it is judged if the number of a page to be displayed is equal to or smaller than the maximum value of the number of pages presently allowed by the page counter. If the number of the page is larger than the maximum value, it means that there is no corresponding data to be displayed. Therefore, the flow advances to step 63.

If the contents of the page counter is smaller than the maximum value at the judgement step 64, the corresponding page data are stored in the memory so that the flow advances to step 65 whereat the contents of the page counter are increased by the positive number. At the next step 66, the display change flag value is set at "1". At the next step 67 the display counter is set at "0" to terminate the interruption.

If the page decrement/increment value takes a "negative number", the flow advances from step 62 to step 68 whereat it is judged if the number of a page to be displayed is equal to or larger than the minimum value of the number of pages presently allowed by the page counter. If the number of the page is smaller than the minimum value, it means that there is no corresponding page data in the memory so that the flow advances to step 63. If the number of the page is equal to or larger than the minimum value, there is the corresponding page data so that the flow advances to step 69 whereat the contents of the page counter are decremented by the negative number. At step 70 the display change flag value is set at "1", and at step 71 the display counter is set at "0" to terminate the interruption. In the above processing 60, the page change flag, display change flag, page counter, and display counter have all been set.

Figure 11:
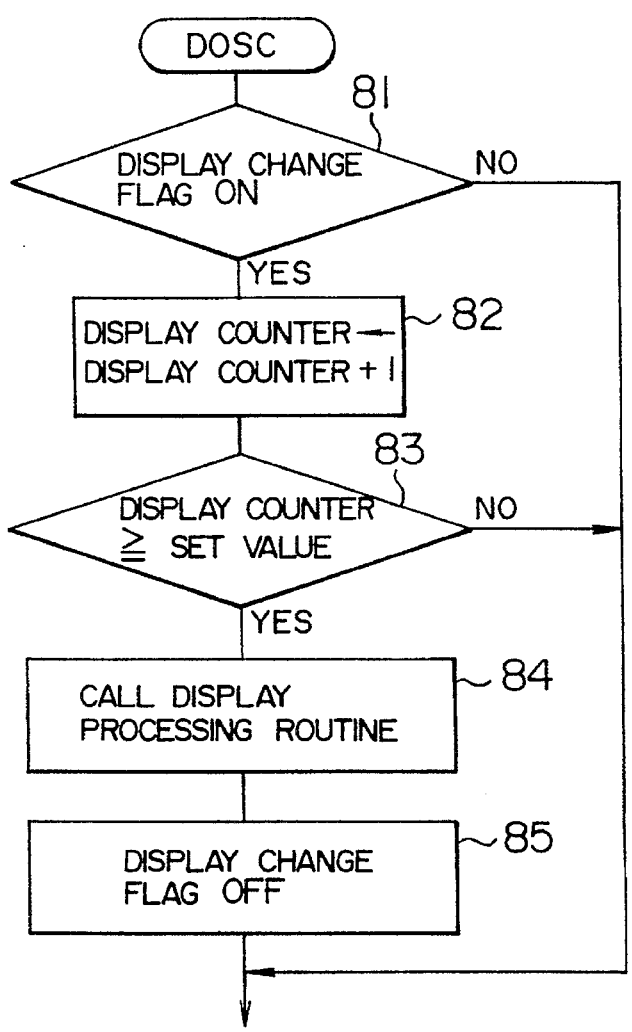
FIG. 11 is a flow chart illustrating the display processing shown in FIG. 5.
Figure 12:
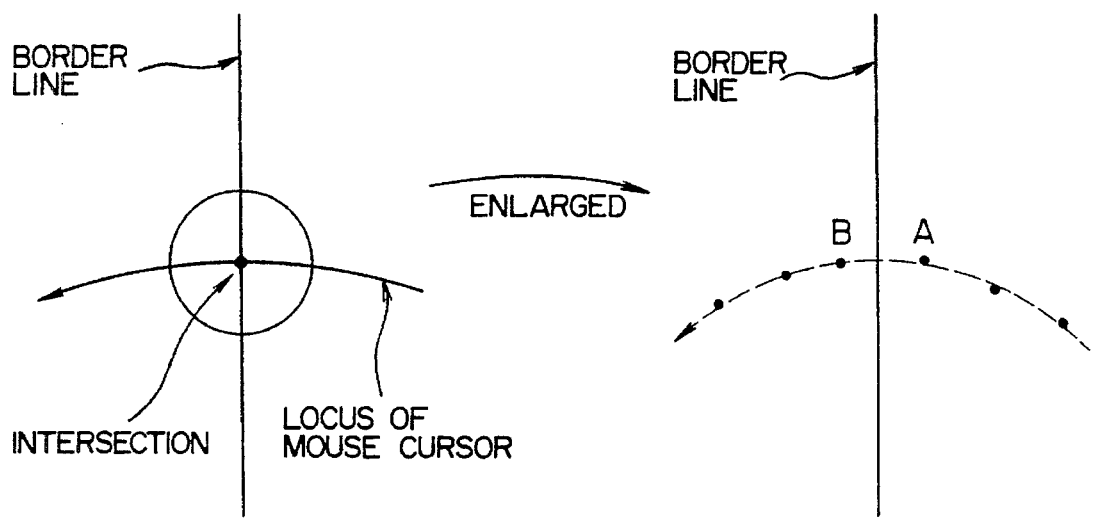
FIG. 12 are diagrams explaining a judgement concerning page turning.

If it is judged at step 50 shown in FIG. 5 that the page change flag is set at "1" and the flow enters the processing 80, then the display processing shown in detail in FIG. 11 is executed. It is first judged at step 81 whether the display change flag value is "1" or not. This display change flag takes a value "1" when the contents of the page counter are changed as described with FIG. 10. Accordingly, if the display change flag takes a value "0", it is not necessary to change the screen image to accordingly terminate the interruption.

If the display change flag takes a value "1", the flow advances from step 81 to step 82 to change the screen image. After the contents of the display counter are incremented by 1, the flow advances to step 83. At step 83, it is judged if the contents of the display counter is equal to or larger than the predetermined set value. If smaller than the set value, the interruption is terminated. If it is judged at step 83 that the contents of the display counter are equal to or larger than the set value, the flow advances to step 84 whereat the display processing routine is called to change the screen image data. In the display processing routine, while considering the increasing or decreasing direction of the present page turning operation, pages increased or decreased in number by the display counter contents are displayed. At the next step 85, the display change flag is set at "0" to terminate the interruption.

In accordance with the page turning processing described above, the screen image data is changed. The reason of providing the display counter and the display counter comparison set values is as follows. For example, if an operator wishes to set the screen image 10 pages after the currently displayed screen image, the operator causes to reciprocally move the mouse cursor quickly. In this embodiment, the means for detecting the quick motion of the mouse cursor is realized by depressing both the right and left cursor buttons.

Other means may also be used. In the above example, the necessary screen image data to be displayed are the data 10 pages after the presently displayed screen image data, and the intermediate screen image data are not necessary to be displayed. In such a case, the display counter comparison set value is set at "10". This value "10" is compared with the contents of the display counter at step 83 so as to display the screen image data only at page 10 without displaying the screen image data from page 1 to page 9. If it is not necessary to display the intermediate screen image data, it is obvious that the above process is not carried out and the set value is always given "1" to display all screen image data consecutively. The choice therebetween may be made by an operator. If a CPU of low processing speed is used, it takes a long time to consecutively display all screen image data. In such a case, the method as in this embodiment can be used effectively.

In the above embodiment, the screen image is adapted to be changed when the mouse cursor crosses over the border line drawn on the screen. The border line is not necessary to be drawn actually. For example, if the screen image is displayed over the entire surface of the screen, such a border line for use in judging a screen image change may cause poor visual recognition of the image. In view of this, a border line for use in judging a screen image change may be drawn in software manner at a suitable position for an operator. In this case, the above-described processings are carried out in the same manner. Instead of a definite border line, it is also possible to detect the motion of the mouse cursor from a particular zone to another particular zone with similar processings to the above embodiment. If graphics image data other than text data such as large graphics data are displayed, the above concept of displaying the screen image in units of page becomes different in some sense. For example, consider the case where not all the area of, but a part of the area of a graphics image of a large house as shown in FIG. 13 is displayed on the screen 5 of a display unit 2. If the area consecutive to the right side of the presently display area is to be displayed, an operator makes the mouse cursor to become in contact with the right side end of the screen. Then, the central processing unit detects the contact of the mouse cursor 6 with a line on the screen right side, detects the depression of the mouse button for example, and causes to change the presently displayed screen image to the image consecutive to the right side thereof. With such an arrangement, the operator recognizes as if the screen 5 has been moved in the direction A by means of the cursor 6, so that without losing the continuity of the graphics image the screen image can be changed. If the screen 5 is intended to be moved to the lower, upper or right side, the cursor 6 is made in contact with the lower, upper or right side edge of the screen 6, respectively. It is apparent that the screen 5 may be so arranged to move obliquely in the upper right direction, for example, upon detecting that the cursor 6 is in contact with the right end of the screen and is moved obliquely in the upper right direction. In the above description, it is assumed that the mouse cursor 6 is allowed to move over the entire area of the screen 5. In stead, the mouse cursor may be restricted to move within a small rectangular area within the screen and the contact with the edge of the small rectangular area is detected to perform the processings similar to those described above. Such a small area may be a circular area so that the screen image is changed to another screen image consecutive in the direction of radially extending from the contact point of the mouse cursor with the outer periphery of the circular area.

In the above embodiment, the page turning processing is called within an interruption processing. This processing may be realized as an independent processing so that the overall processing can be more simplified than the above embodiment.

As appreciated from the foregoing description of this invention, the operation to change a screen image can be carried out efficiently and conveniently while retaining a matching with a human behavior, thereby allowing a good operability of data processing apparatus and an easy use of complicated computer systems by general laymen.

I claim:

1. A method of sequentially displaying a plurality of screen image data one after another on a screen in such a manner so as to imitate manual turning of pages of a document by a human, comprising the steps of:

setting a mark at a predetermined location on said screen relative to said document thereby dividing at least a partial region of said screen into at least two areas, wherein movement of a cursor from one of said areas to the other area causes a change on said screen from screen image data representing a page of said document to screen image data representing a next page of said document;

detecting whether an operator moves said cursor on said screen from one of said areas to the other area;

selecting said screen image data representing said next page of said document to be displayed next on said screen from said plurality of screen image data when movement of said cursor from said one area to the other area is detected; and displaying said screen image data representing said next page of said document on said screen thereby imitating manual turning of pages of said document by a human.

2. A method according to claim 1, wherein said setting step includes a step of setting as said mark a line at said predetermined position on said screen, and said detecting step includes a step of detecting whether said operator moves said cursor to cross over said line.

3. A method according to claim 1, wherein said setting step includes a step of setting as said mark a side edge of said screen.

4. A method according to claim 1, wherein said setting step includes a step of setting as said mark a side edge of said screen, and said selecting step includes a step of selecting as said screen image data to be displayed next on said screen, screen image data consecutive in a direction extending from said side edge of said screen, from among said plurality of screen image data.

5. A method of sequentially displaying a plurality of screen image data one after another on a screen, comprising the steps of:

setting a mark at a predetermined location on said screen thereby dividing at least a partial region of said screen into at least two areas, wherein movement of a cursor from one of said areas to the other area causes a change from screen image data being displayed on said screen to screen image data to be displayed next on said screen;

detecting whether an operator moves said cursor on said screen from one of said areas to the other area;

selecting screen image data to be displayed next on said screen among said plurality of screen image data when movement of said cursor from said one area to the other area is detected; and displaying said next screen image data on said screen;

wherein said detecting step includes the steps of:

if movement of said cursor from one of said areas to the other area is detected at least a predetermined number of times within a predetermined period of time, omitting display of intermediate screen image data, and displaying screen image data last selected on said screen.

6. A method according to claim 1, wherein said setting step includes a step of setting and displaying said mark at said predetermined location of said screen.

7. A method according to claim 1, wherein said setting step includes the steps of:

setting said mark at said predetermined location of said screen; and not visually displaying said mark set on said screen.

8. A method of sequentially displaying a plurality of screen image data one after another on a screen in such a manner so as to imitate manual turning of pages of a document by a human, comprising the steps of:

dividing at least a partial region of said screen, which has displayed thereon a page of said document, into at least two areas;

detecting whether an operator moves a cursor on said screen from one of said areas to the other area;

selecting screen image data representing a next page of said document to be displayed next on said screen from said plurality of screen image data when movement of said cursor from said one area to the other area is detected; and displaying said screen image data representing said next page of said document on said screen thereby imitating manual turning of pages of said document by a human.

9. A method according to claim 8, wherein said dividing step includes the steps of:

dividing at least a partial region of said screen, which has displayed thereon a page of said document, into at least two areas; and displaying said divided areas on said screen relative to said document.

10. A method according to claim 8, wherein said dividing step includes the steps of:

dividing at least a partial region of said screen, which has displayed thereon a page of said document, into at least two areas; and not visually displaying said divided areas on said screen relative to said document.

11. A method of sequentially displaying a plurality of screen image data one after another on a screen, comprising the steps of:

dividing at least a partial region of said screen into at least two areas;

detecting whether an operator moves a cursor on said screen from one of said areas to the other area;

selecting screen image data to be displayed next on said screen from among said plurality of screen image data when movement of said cursor from said one area to the other area is detected; and displaying said next screen image data on said screen;

wherein said detecting step includes the steps of:

if said cursor is detected to move from said one area to the other area at least a predetermined number of times within a predetermined period of time, omitting display of intermediate screen image data, and displaying screen image data last selected on said screen.

12. A data processing apparatus for sequentially displaying a plurality of screen image data one after another on a screen in such a manner so as to imitate manual turning of pages of a document by a human, comprising:

a display unit having a screen on which screen image data are sequentially displayed one after another;

memory means for storing said plurality of screen image data to be displayed on said screen;

mark setting means for setting a mark at a predetermined location on said screen relative to said document thereby dividing at least a partial region of said screen into at least two areas;

cursor inputting means for displaying a cursor on said screen and entering an instruction to move said cursor, wherein movement of said cursor from one of said areas to the other area causes a change on said screen from screen image data representing a page of said document to screen image data representing a next page of said document;

cursor motion detecting means for detecting whether an operator moves said cursor on said screen from one of said areas to the other area;

screen image data selecting means for selecting said screen image data representing said next page of said document to be displayed next on said screen from said plurality of screen image data stored in said memory means when movement of said cursor from one of said areas to the other area is detected by said cursor motion detecting means; and display control means for controlling said screen to display said screen image data representing said next page of said document selected by said screen image data selecting means on said screen thereby imitating manual turning of pages of said document by a human.

13. A data processing apparatus according to claim 12, wherein said mark setting means includes means for setting as said mark a line, and said cursor motion detecting means includes means for detecting whether said operator moves said cursor to cross over said line.

14. A data processing apparatus according to claim 12, wherein said mark setting means includes means for setting as said mark a side edge of said screen.

15. A data processing apparatus according to claim 12, wherein said mark setting means includes means for setting as said mark a side edge of said screen;

said cursor motion detecting means includes means for detecting whether said operator moves said cursor from one of said areas to the other area and detecting a direction of movement of said cursor; and said screen image data selecting means includes means for selecting as screen image data to be displayed next screen image data consecutive in the direction of movement of said cursor, from among said plurality of screen image data stored in said storage means.

16. A data processing apparatus according to claim 12, wherein said mark setting means includes means for setting said mark at said predetermined location relative to said document on said screen and displaying said mark on said screen.

17. A data processing apparatus according to claim 12, wherein said mark setting means includes means for setting said mark at said predetermined location relative to said document on said screen and not visually displaying said mark on said screen relative to said document.

18. A data processing apparatus wherein said screen image data selecting means includes means for selecting, if said cursor motion detecting means detects that said cursor moves from one of said areas to the other area at least a predetermined number of times within a predetermined period of time, screen image data last selected within said predetermined period of time as screen image data to be displayed next, and omitting the display of intermediate screen image data on said screen.

19. A data processing apparatus for sequentially displaying a plurality of screen image data one after another on a screen in such a manner so as to imitate manual turning of pages of a document by a human, comprising:

a display unit having a screen on which screen image data are sequentially displayed one after another;

memory means for storing said plurality of screen image data to be displayed on said screen;

screen dividing means for dividing at least a partial region of said screen, which has displayed thereon a page of said document, into at least two areas;

cursor inputting means for displaying a cursor on said screen and inputting an instruction to move said cursor;

cursor motion detecting means for detecting whether an operator moves said cursor on said screen from one of said areas to the other area;

screen image data selecting means for selecting screen image data representing a next page of said document to be displayed next on said screen from said plurality of screen image data stored in said memory means when movement of said cursor from said one area to the other area is detected by said cursor motion detecting means; and display controlling means for controlling said screen to display said screen image data representing said next page of said document selected by said screen image data selecting means on said screen thereby imitating manual turning of pages of said document by a human.

20. A data processing apparatus according to claim 19, wherein said cursor motion detecting means includes means for detecting that said cursor is moved from one of said areas to the other area and detecting a direction of movement of said cursor; and said screen image data selecting means includes means for selecting as screen image data to be displayed next on said screen, screen image data consecutive in the direction of movement of said cursor, from among said plurality of screen image data stored in said storage means.

21. A data processing apparatus according to claim 19, wherein said screen dividing means includes means for dividing at least a partial region of said screen, which has displayed thereon a page of said document, into at least two areas, and displaying said divided areas on said screen.

22. A data processing apparatus according to claim 19, wherein said screen dividing means includes means for dividing at least a partial region of said screen, which has displayed thereon a page of said document, into at least two areas, and not visually displaying said divided areas on said screen.

23. A data processing apparatus apparatus comprising:

a display unit having a screen on which screen image data are sequentially displayed one after another;

memory means for storing a plurality of screen image data to e displayed on said screen;

screen dividing means for dividing at least a partial region of said screen into at least two areas;

cursor inputting means for displaying a cursor on said screen and inputting an instruction to move said cursor;

cursor motion detecting means for detecting whether an operator moves said cursor on said screen from one of said areas to the other area;

screen image data selecting means for selecting screen image data to be displayed next on said screen from among said plurality of screen image data stored in said memory means when movement of said cursor from said one area to the other area is detected by said cursor motion detecting means; and display controlling means for controlling said screen to display said screen image data selected by said screen image data selecting means on said screen;

wherein said screen image data selecting means includes means for selecting, if said cursor motion detecting means detects that said cursor is moved from one of said areas to the other area at least a predetermined number of times within a predetermined period of time, the screen image data last selected within said predetermined period of time as said screen image data to be displayed next on said screen, and omitting display of intermediate screen image data on said screen.

\* \* \* \* \*